Inventor
Chas Halbreich.
by his atty

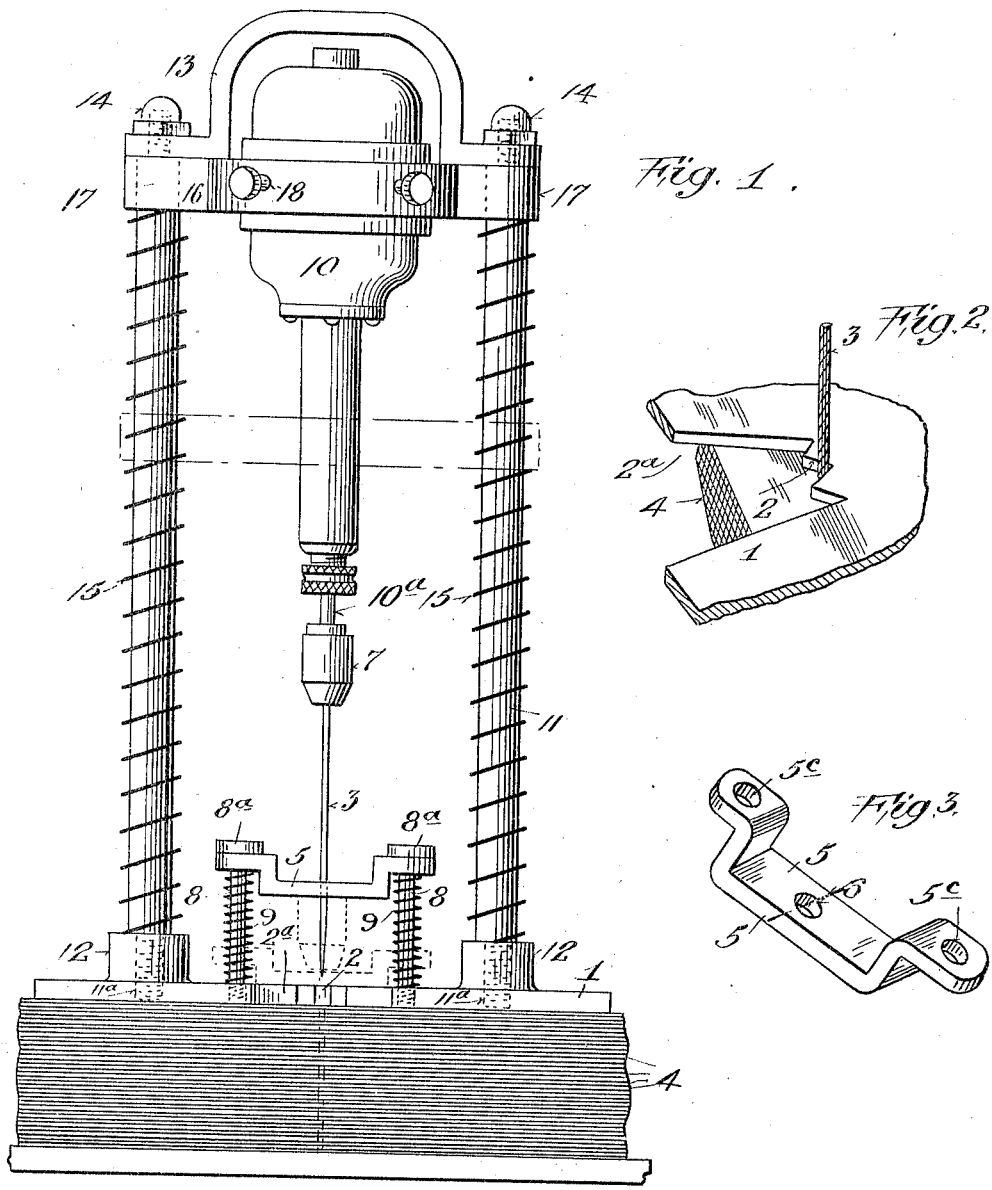

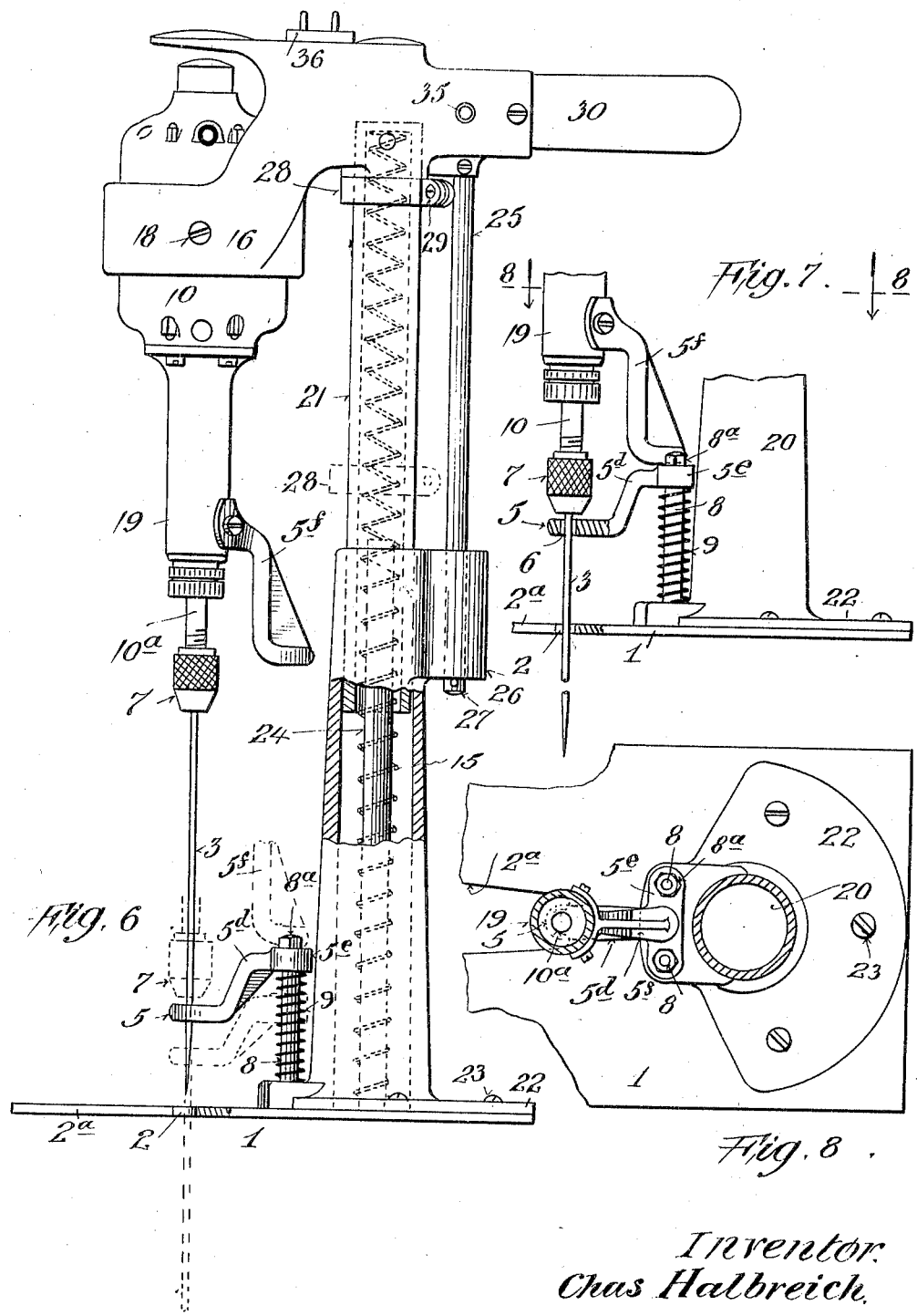

UNITED STATES PATENT OFFICE.

CHARLES HALBREICH, OF MAYWOOD, NEW JERSEY.

PORTABLE DRILL.

1,316,028.     Specification of Letters Patent.     Patented Sept. 16, 1919.

Continuation in part of application Serial No. 188,716, filed August 29, 1917. This application filed May 20, 1918. Serial No. 235,491.

*To all whom it may concern:*

Be it known that I, CHARLES HALBREICH, a subject of Russia, and resident of Maywood, in the county of Bergen and State of New Jersey, have invented certain new and useful Improvements in Portable Drills, of which the following is a specification.

This application is a continuation in part of my application for improvements in portable drills, filed August 29, 1917, Serial No. 188,716.

My invention relates to improvements in portable drills adapted to be placed upon articles to be drilled, and has particular reference to means for permitting the use of relatively long drills of small diameter, whereby the latter may be guided to the work accurately, while permitting ready view of the place in which the hole in the work is to be drilled.

My invention is particularly adapted for drilling holes in stacked pieces of fabric, such as for marking numerous pieces of fabric simultaneously by drilling holes therein, and according to a pattern, to indicate places where further work is to be done upon the pieces of fabric.

My invention comprises novel details of improvement and combinations of parts that will be more fully hereinafter set forth and then pointed out in the claims.

Reference is to be had to the accompanying drawings forming part hereof, wherein.

Figure 4:
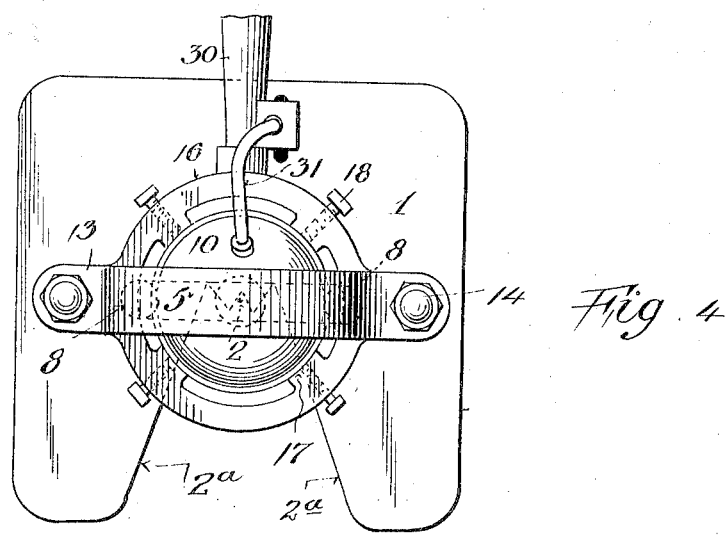
Figure 5:
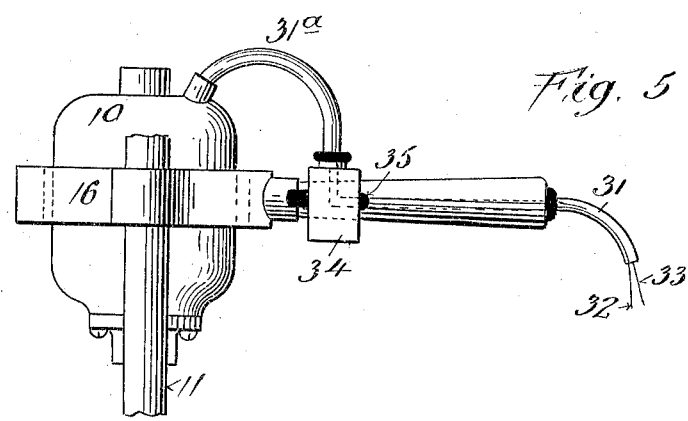

Figure 1 is a front elevation of a portable drill embodying my invention; Fig. 2 is a fragmentary perspective view illustrating a portion of the base of the drill; Fig. 3 is a perspective detail view of a drill guide; Fig. 4 is a plan view of my improved portable drill; Fig. 5 is a side view of a portion of the drill; Fig. 6 is a partly broken side elevation illustrating a modification; Fig. 7 is a detail side view of Fig. 6, illustrating parts in a different position, and Fig. 8 is a section on the line 8, 8, in Fig. 7.

Similar numerals of reference indicate corresponding parts in the several views.

In the accompanying drawings the numeral 1 indicates the base of my improved portable drill, which may comprise a suitable flat relatively thin metal plate having an opening at 2, for the passage of a tool, such as a drill 3 to the goods 4 to be drilled. The opening 2 is shown in V-like form cut into the edge of an enlarged opening $2^a$ in base 1 (Fig. 2), whereby a mark on the goods 4 may be readily seen indicating where a hole is to be drilled in the goods. At 5 is a movable guide shown provided with a hole 6 of suitable dimensions relatively to drill 3 for the passage of the latter to guide the same to the work, which guide is supported above base 1 in a resilient manner, so that said guide may descend toward the base with the drill (Figs. 1, 2 and 3). The guide 5 is shown movably mounted on the base by means of spaced guiding posts 8 suitably secured to and projecting upwardly from said base, said guide being shown provided with spaced guiding apertures $5^c$, receiving said posts (Fig. 3). The posts 8 have stops or heads $8^a$ at their upper ends to limit the upward movement of guide 5, and at 9 are springs interposed between the guide and the base tending normally to raise the guide from the base against the stops $8^a$. The posts may be in the form of headed screws threaded into the base. The central portion $5^b$ of guide 5 is shown depressed below the side portions that have the apertures $5^c$ against which the springs 9 operate, whereby the central drill-guiding portion of the guide may be depressed toward the goods 4 without interference by springs 9. In the form shown in Figs. 1 and 4 the guide 5 is directly beneath the chuck 7 to which the tool 3 is attached, whereby when the chuck is depressed it will encounter the guide and push it downwardly toward the base, as indicated in Fig. 1. Chuck 7 is rotatively carried upon spindle or shaft $10^a$ of electric motor 10, which is movably mounted to be raised and lowered relatively to the base. Instead of locating the movable guide 5 directly beneath chuck 7, in such manner that the chuck itself will encounter and depress said guide, the latter may have its aperture 6 beneath the chuck to receive the tool or drill 3, but its supporting posts 8 may be at one side of the path of the drill, as illustrated in Figs. 6, 7 and 8. For such purpose I have shown the guide provided with an upward extension $5^d$ having a transverse member $5^e$ containing the apertures $5^c$ slidably receiving the posts 8 and bearing upon the springs 9, whereby the members 5, $5^d$ and $5^e$ are normally raised, the aperture 6 in member 5 receiving the drill in manner before described. At $5^f$ is a projection carried by the motor extension 19, and located over the member 5ᵉ in such position that when the motor has been depressed with the tool or drill to a suitable extent, the projection 5ᶠ will encounter member 5ᵉ and will push the same downwardly toward the base. The relation of the lower operating end of projection 5ᶠ to the lower end of the chuck is such that said projection will engage member 5ᵉ, but the chuck need not engage the guide 5, as illustrated in dotted lines in Fig. 6. In either form the guide is normally at a suitable height above the base so as to guide the tool or drill 3 when it is at the limit of its upper position, and to guide the tool or drill while being lowered, and whereby as the motor descends the guide will be pushed down toward the base, whereby the guide continues to guide the tool or drill. By this means a relatively long drill of small diameter may be properly utilized and nearly the full length of the drill may be used for the goods. A particular utility of my improved portable drill is that it may be used upon stacks of webs, such as cloth, silk or the like, containing numerous layers thereof so that each of the layers may be marked by drilling through the same in the same relative positions as respects markings placed upon the top layer by means of a suitable pattern, such as is frequently done in marking layers of fabric for the manufacture of different kinds of clothing.

In Figs. 1, 4 and 5 the base 1 is shown provided with spaced uprights 11, adapted to guide the motor, the posts 8 and guide 5 in said figures being located between the uprights 11. Said uprights may be secured to the base in any suitable manner, such as by threading the lower ends of the uprights at 11ª and screwing them into threaded hubs 12 on the base. At 13 is a brace at the upper ends of uprights 11, to secure them firmly together. Said brace may have holes at its ends receiving the threaded ends of the uprights 11, upon which threaded ends nuts 14 are provided. The threaded upper ends of the uprights by being reduced in diameter provide shoulders against which the ends of brace 13 are forced by the nuts 14 for rigidly holding the parts together. At 15 are coiled springs interposed between base 1 and a frame 16 to which the motor is attached. Said frame is shown provided with projecting end portions at 17 having apertures receiving and slidable along uprights 11, the springs 15 serving to normally raise frame 16 and the motor and to permit the depression of the latter. I have shown said frame in ring or annular form (Fig. 4) adapted to receive the motor therein, the inner portion of said ring being shown provided with spaced lugs 17 opposing the motor frame, which fits adjustably therein, screws at 18 threaded through the frame 16 and the lugs 17 serving when screwed against the motor frame to properly center the same with respect to the hole 6 of guide 5 and with respect to the opening 2 of the base, and to securely hold the motor in frame 16. By the means described the motor may be depressed against the tension of springs 15 to present drill 3 to the work, and when the motor is released said springs will raise the motor and the drill from the work.

In the form shown in Figs. 6, 7 and 8 the motor frame is resiliently supported by spring 15, within telescopic members 20, 21. The member 20 has a flange 22 secured to base 1 as by screws 23, and located at one side of posts 8. Member 21 is shown slidable within member 20 and at 24 is a rod secured within member 20 and receiving spring 15 for guiding the latter. The motor frame 16 is secured to the motor as by screws 18 on opposite sides, and the tubular member 21 is secured to and depends from frame 16. At 25 is a rod secured to the motor frame 16 and depending therefrom parallel to and spaced from member 21, which rod is slidable in a bore in a projection 26 extending from member 20. Rod 25 is provided with a pin or projection 27 adapted to engage the projection 26 to limit the upward movement of member 21 and the motor by the action of spring 15. The rod 25, therefore, has the functions of limiting the upward movement of the motor and permitting its depression as well as preventing rotation of member 21 with respect to member 20, whereby the motor and drill are guided in proper relation to the aperture 6 of guide 5. At 28 is an adjustable stop or collar upon member 21, which may be in the form of a split collar and provided with a screw 29 for clamping the members together. Said stop or collar may be adjusted along member 20 and set in adjusted position (see dotted lines in Fig. 6), whereby the depression of the motor may be limited, since said stop or collar will engage the upper part of member 20. The arrangement is useful as it is desired to limit the downward movement of tool or drill 3, according to the thickness of the work to be drilled.

Frame 16 is shown provided with a handle 30 projecting from one side thereof, and suitably secured thereto, whereby the motor may be depressed and raised on its guiding uprights. An electric conductor, such as in the form of a cable, indicated at 31, adapted to communicate with a source of electric supply, may pass through the handle 30, and the conductors 32, 33 terminate in a switch box 34, that is secured to said handle in convenient position for operation of the switch member 35, as in Figs. 4 and 5, although the switch box and its member 35 may be concealed within the handle and electrical connection made by a terminal box 36, as indicated in Fig. 6. The particular arrangement of connecting the supply circuit for the motor may be arranged in any other suitable manner, but by having the switch upon the handle or frame of the device the current readily may be controlled.

My improved portable drill may be placed upon a stack of goods with the drill over a marking thereon, such as a mark made from a pattern, and the motor may be readily depressed to cause the drill to enter the goods, the guide 5 serving to guide the drill in its various positions of depression, and the guide will be depressed close down to the goods, thereby continuing to guide the drill to its lowest movement. Such construction is of advantage where webs of fabric in a stack are being drilled so as to prevent the tendency of a long drill to cause movement of the webs relatively one to another and to prevent wabbling of the drill before it encounters the goods, which might occur with relatively long thin drills, such as used with my improvements, for marking layers of fabric simultaneously. A further advantage of my improvement is that base 1 may be readily moved around and placed upon different parts of the goods according to the markings thereon, and the weight of the device, in addition to the downward pressure, due to the operation of the motor, will serve to aid in holding the stack of goods in firm position for drilling.

My invention is not limited to the particular details of construction and arrangement of parts set forth, as the same may be varied, within the scope of the appended claims, without departing from the spirit of the invention.

Having now described my invention what I claim is:

1. A portable drill having a base provided with a drill opening, a motor, means to support the motor for movement toward and from the base, means to attach a drill to the motor shaft, a guide for the drill movable toward and from the base and opposing the tool attachment between the latter and the base, and means upon the base movably supporting said guide normally above the base to permit the guide to be depressed toward the base upon appropriate depression of the motor.

2. A portable drill having a base provided with a drill opening, a motor, means to support the motor for movement toward and from the base, means to attach a drill to the motor shaft, a guide for the drill movable toward and from the base and opposing the tool attachment between the latter and the base, guiding means for the guide on the base, and resilient means for normally retaining the guide above the base to permit the guide to be depressed toward the base upon appropriate descent of the motor.

3. A portable drill having a base provided with a drill opening, a motor, means to support the motor for movement toward and from the base, means to attach a drill to the motor shaft, a guide for the drill movable toward and from the base and opposing the tool attachment between the latter and the base, posts on the base guiding the drill guide movably toward and from the base, and resilient means for said guide normally raising it from the base.

4. A portable drill having a base provided with a drill opening, a motor, means to support the motor for movement toward and from the base, means to attach a drill to the motor shaft, a guide for the drill movable toward and from the base and opposing the tool attachment between the latter and the base, said guide having a depressed apertured portion for the drill, guiding means for the guide, and resilient means normally elevating the guide from the base to permit depression of the guide with the drill.

5. A portable drill having a base provided with a drill opening, a motor, means to support the motor for movement toward and from the base, means to attach a drill to the motor shaft, a guide for the drill movable toward and from the base and opposing the tool attachment between the latter and the base, said guide having a member at one side thereof, posts extending upwardly from the base guiding said member to permit movement of the guide toward and from the base, one or more springs for the guide normally raising it from the base, said motor having a projection to coöperate with said member for depressing the latter and the guide upon appropriate approach of the motor toward the base.

6. A portable drill having a base, a motor, a tubular member secured upon the base at one side of the motor, a tubular member coöperative with the first named tubular member and secured to the motor, a spring within said tubular members normally raising the second named member and the motor from the base, a rod carried by said second named member and spaced therefrom, the first named member having a projection slidably receiving said rod, said rod having a stop coöperative with said projection to limit the upward movement of the rod, the movable member and the motor.

7. A portable drill having a base, a motor, a tubular member secured upon the base at one side of the motor, a tubular member coöperative with the first named tubular member and secured to the motor, a spring within said tubular members normally raising the second named member and the motor from the base, means to limit the upward movement of said member and motor, and a stop adjustably carried by the movable member and coöperative with the other member to limit the descent of the movable member and motor toward the base.

8. A portable drill comprising a relatively large flat base having an extended smooth lower surface to rest upon a stack of goods to be drilled, said base being provided with an opening for a drill, a motor, means extending upwardly from the top of the base to support the motor for movement toward and from the top of the base over said opening, means to attach a drill to the motor shaft, a guide for the drill opposing and spaced from the tool attachment between the base and the motor, movable means above the base for guiding the guide for movement toward and away from the top of the base, and spring means normally elevating the guide above the base to permit its depression toward the base by a part of the machine with the drill and movement of the drill relatively to the guide through the guide and base.

Signed at New York city, in the county of New York, and State of New York, this 18th day of May, A. D. 1918.

CHARLES HALBREICH.

Copies of this patent may be obtained for five cents each, by addressing the "Commissioner of Patents Washington, D. C."